Oct. 30, 1923.　　　　　　　　　　　　　　　　1,472,674
W. G. REAGAN
COMBINED EGG CANDLING AND ASSEMBLING DEVICE
Filed Jan. 3, 1922
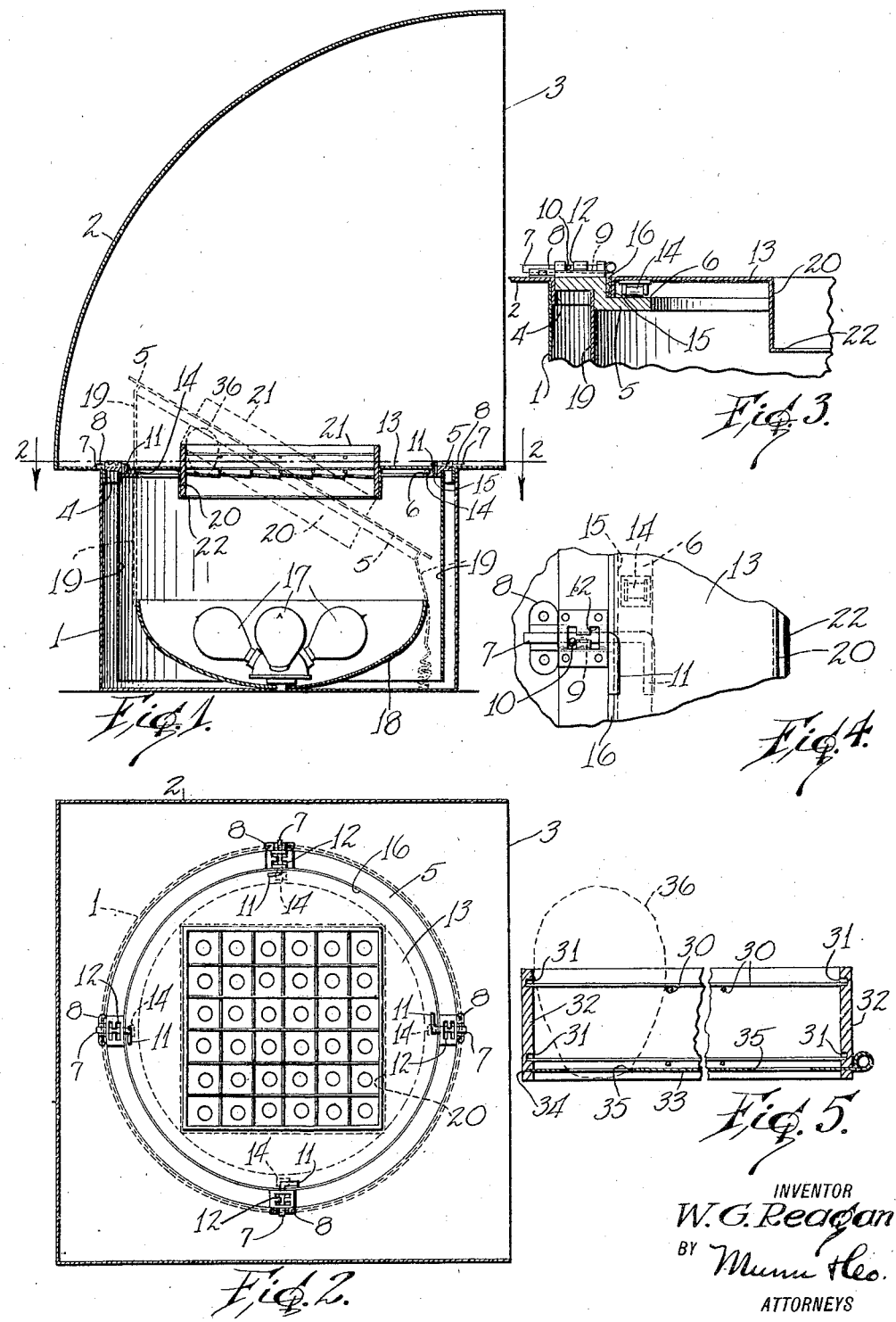
INVENTOR
W. G. Reagan
BY Munn & Co.
ATTORNEYS Patented Oct. 30, 1923.

1,472,674

UNITED STATES PATENT OFFICE.

WALTER G. REAGAN, OF LEBANON, INDIANA.

COMBINED EGG CANDLING AND ASSEMBLING DEVICE.

Application filed January 3, 1922. Serial No. 526,824.

*To all whom it may concern:*

Be it known that I, WALTER G. REAGAN, a citizen of the United States, and a resident of Lebanon, in the county of Boone and State of Indiana, have invented a new and useful Improvement in Combined Egg Candling and Assembling Devices, of which the following is a full, clear, and exact description.

My invention relates to improvements in combined egg candling and assembling devices, and it consists in the combinations, constructions, and arrangements herein described and claimed.

An object of my invention is to provide an improvement over the combined egg candling and assembling device shown in my application, Serial No. 505,855, filed October 6, 1921. In said application I showed a device by means of which a plurality of eggs were candled simultaneously. I also showed a novel candling tray, in which the eggs contained therein could be deposited in an egg case in the same relative position which they occupied in the candling tray without the necessity of removing the eggs from the tray by hand. The construction of the present device is primarily designed to permit the shaking of the eggs while they are being candled.

A further object of my invention is to provide a device of the type described in which a candling tray is so constructed that practically the entire egg in each compartment of the tray can be readily seen by the operator.

A further object of my invention is to provide a device of the character described in which the candling tray may be readily rotated so as to bring the various sides of the tray into the operator's line of vision, whereby all of the eggs can be viewed at a closer range.

A further object of my invention is to provide a device of the type described which has an egg tray of novel construction.

A further object of my invention is to provide a device of the type described which is relatively simple in construction, has few moving parts, and is not likely to easily get out of order.

Other objects and advantages will appear in the following specification, and the novel features of the invention will be particularly pointed out in the appended claims.

My invention is illustrated in the accompanying drawings, forming part of this invention, in which—

Figure 1 is a vertical section through the device,

Figure 2 is a section along the line 2—2 of Figure 1,

Figure 3 is an enlarged section of a portion of the device,

Figure 4 is a plan view of the portion of the device shown in Figure 3, and

Figure 5 is a modified form of the egg tray used in the device.

In carrying out my invention, I provide a casing 1 which is cylindrical in shape and which is open at its upper end. The casing supports a hood 2 of the shape shown in the drawing, the casing being so constructed as to provide an opening 3 through which the top of the casing 1 may be viewed. The hood 2 is secured to the casing 1 in any well known manner, such as by providing the hood 2 with a flange 4 which projects into the casing 1 and which is secured to the wall thereof. I then mount a ring 5 in the top of the casing 1, the outer diameter of the ring being the same as the inner diameter of the casing 1. The ring 5 is provided with a track 6 for a purpose hereafter described. As clearly shown in Figures 3 and 4, the ring 5 also carries locking bolts 7 which are adapted to project beyond the periphery of the ring 5 and to rest on semi-cylindrical bearing boxes 8, the latter being carried by the hood 2. The bolts 7 are slidably disposed in a bore 9, the wall of the bore having an H-shaped slot 12 therein in which a pin 10 is slidably disposed. The pin 10 is carried by the bolt 7 and locks the bolt in closed or open position. The bolt 7 has a handle 11 by means of which it is rotated so as to permit the pin to slide in the slot 12.

It is apparent that as many of the bolts 7 as desired may be carried by the ring 5 and when extended into opened position, will rest on the bearings 8 and will support the ring 5. In the present form of the device I have shown four of these bolts and have disposed them 90° apart. The ring 5 supports an egg tray carrying turntable 13. The turntable 13 has rollers 14 secured thereto and which are adapted to rotate on the track 6. The turntable 13 is further provided with a downwardly extending flange 15 which is adapted to abut the fibrous lining 16 which in turn is carried by the ring 5. A plurality of lights 17 are carried by the casing 1 and are disposed in a reflector 18. The lining 16 and the flange 15 are provided for the purpose of stopping any of the light rays from the lights 17 from passing between the turntable 13 and the ring 5. As a further precaution against the admission of light into the hood 2, except through the desired opening hereafter described, is provided, and comprises a curtain 19 which is carried by the ring 5 and is adapted to enclose the reflector 18. The turntable 13 has a depression 20 therein which is adapted to support an egg candling tray 21. This tray has movable bottoms which are held up by springs (not shown), the bottoms having openings therein which permit the light to pass therethrough. This form of container has been clearly shown and described in my co-pending application and is not essential to the operation of the present form of the device. It will be apparent that a candling tray having a bottom with a plurality of openings therein would be sufficient for the purpose intended.

From the foregoing description of the various parts of the device, the operation thereof may be readily understood. The tray 21 is filled with eggs and is placed in the depression 20 of the turntable 13. It will be observed that the depression 20 has a square opening 22 therein which permits the light rays to pass into the tray. The eggs now may be readily candled, and, by merely rotating the turntable 13, the various sides of the tray may be brought into view, whereby the eggs may be viewed from all sides thereof. As a further advantage, the tray 21 may be shaken by oscillating the turntable 13 with respect to the ring 5. This rapid movement of the turntable 13 will cause the contents of the eggs to be shaken and to thereby determine the condition of the eggs. As a still further means of viewing all sides of the eggs, I may retract either set of the diametrically disposed bolts 7, whereby the ring 5 is pivotally supported by the two remaining bolts which are disposed in the bearings 8. The ring 5 may now be readily swung about the two extended bolts 7 as a pivot. In like manner, the two extended bolts may be retracted and the other two bolts extended, whereby the ring may be swung about an axis which is at right angles to the swinging axis of the former bolts.

It will be seen from the foregoing that any portion of the tray may be brought to the vision of the operator and may be tilted to any desired angle, thus bringing to view all sides of the eggs to be candled.

In Figure 5 of the device, I show a modified form of egg candling tray. In this form, the egg receiving compartments have their walls formed of wires 30. As clearly shown in the drawing, each of the walls is composed of two wires, the ends of the wires being disposed in enlarged recesses 31 of the sides 32 of the tray. The wires 30 extend at right angles to one another and thus provide egg compartments which are adapted to receive eggs therein. A slide 33 is disposed in the grooves 34 of the walls 32 and has openings 35 therein which are adapted to be alined with the egg compartments of the tray. By making the walls of the egg compartments of wire and disposing the ends of the wire in enlarged recesses, three decided advantages over the ordinary candling trays are obtained. In the first place, the wires are more or less flexible and will give so that eggs of varying sizes may be readily disposed in the compartments. In the second place, the walls of the egg compartments being made of wire, permit the lower portions of the eggs to be readily viewed. In the third place, the wires are received in large recesses which permit the wires to move laterally slightly with respect to the walls of the tray and to thereby more readily conform themselves to the various sized eggs contained within the tray. It will further be observed that the egg 36 is adapted to project above the top of the tray a considerable distance so that the egg is not obstructed from view as is the case in the ordinary type of candling trays. In removing the eggs from the tray, the slide 33 is removed and the eggs 36 drop by gravity from the compartments into an egg crate or the like (not shown). This construction provides a ready means of quickly removing the eggs from the tray and at the same time of depositing them into an egg crate or the like without the necessity of removing the eggs by hand.

It is obvious that this device is thoroughly practical for the work intended and also efficient. This device has three improvements over the ordinary devices, namely: the eggs may be brought into close proximity to the operator by merely rotating or swinging the turntable 13; the eggs may be shaken by swinging the turntable 13, thus readily ascertaining the condition of the contents of each egg; and the eggs may be readily viewed in their entirety through the wired walls of the egg compartments.

I claim:

1. A device of the type described comprising a casing open at its upper end, a hood carried by said casing, a ring carried by said casing and being adapted to be swung with respect to said casing, and a turntable carried by said ring, said turntable being adapted to carry a tray.

2. A device of the type described comprising a casing having an opening in its top, a frame disposed in said opening and being adapted to swing about two diametrical axes extending at right angles to each other, an egg candling tray carried by said frame, and lighting means disposed in said casing.

3. A device of the type described comprising a casing having an opening in its top, a frame disposed in said opening and being adapted to swing about two diametrical axes extending at right angles to each other, a turntable rotatably carried by said frame, an egg candling tray carried by said frame, and lighting means disposed in said casing.

4. A devise of the type described comprising a casing having a circular opening in its top, a frame adapted to close said opening, locking means for securing said frame to said casing, said means being adapted to permit the swinging of said frame about two horizontal axes extending at right angles with respect to each other, said frame having an opening therein, an egg candling tray disposed in said opening and being carried by said frame, a reflector disposed in said casing and beneath said tray, lighting means disposed in said reflector, and a curtain secured to said frame and enclosing said reflector.

WALTER G. REAGAN.